(12) United States Patent
Keeler et al.

(10) Patent No.: US 12,388,742 B2
(45) Date of Patent: *Aug. 12, 2025

(54) CROSS DATACENTER COMMUNICATION USING A MESH GATEWAY

(71) Applicant: HashiCorp, San Francisco, CA (US)

(72) Inventors: Matthew Keeler, San Francisco, CA (US); Paul Banks, San Francisco, CA (US); Mitchell Hashimoto, Manhattan Beach, CA (US); Armon Dadgar, Seatle, WA (US)

(73) Assignee: HashiCorp, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,745

(22) Filed: Mar. 2, 2023

(65) Prior Publication Data

US 2023/0208746 A1 Jun. 29, 2023

Related U.S. Application Data

(63) Continuation of application No. 17/125,746, filed on Dec. 17, 2020, now Pat. No. 11,601,358.

(51) Int. Cl.
*H04L 45/122* (2022.01)
*H04L 45/12* (2022.01)
*H04L 45/74* (2022.01)

(52) U.S. Cl.
CPC .......... *H04L 45/122* (2013.01); *H04L 45/126* (2013.01); *H04L 45/74* (2013.01)

(58) Field of Classification Search
None
See application file for complete search history.

(56) References Cited

U.S. PATENT DOCUMENTS

| 7,769,886 | B2 * | 8/2010 | Naseh | H04L 67/1001 |
| | | | | 709/238 |
| 8,165,121 | B1 * | 4/2012 | Singh | H04L 45/28 |
| | | | | 370/251 |
| 8,327,017 | B1 * | 12/2012 | Trost | H04L 45/02 |
| | | | | 709/225 |
| 10,243,834 | B1 * | 3/2019 | Shekhar | H04L 45/64 |
| 10,567,288 | B1 * | 2/2020 | Mutnuru | H04L 41/40 |
| 10,992,566 | B1 | 4/2021 | Dave | |
| 11,201,897 | B1 | 12/2021 | Miseiko | |

(Continued)

OTHER PUBLICATIONS

U.S. Appl. No. 17/125,746, "Non-Final Office Action", Apr. 13, 2022, 14 pages.

(Continued)

*Primary Examiner* — Lonnie V Sweet
(74) *Attorney, Agent, or Firm* — FisherBroyles LLP; James P. Cleary (57) ABSTRACT

A method for cross datacenter service-to-service communication over a shortest network route using mesh gateways. A mesh gateway receives a protocol message from a first service directed to a second service, identifies destination information associated with the second service, recognizes a routing configuration for routing the protocol message, determines a network route based on the routing configuration, and forwards the protocol message to another gateway associated with the second service over the determined network route.

8 Claims, 9 Drawing Sheets

(56) References Cited

U.S. PATENT DOCUMENTS

| | | | |
|---|---|---|---|
| 11,601,358 B2 * | 3/2023 | Keeler | H04L 45/122 |
| 2007/0110063 A1 * | 5/2007 | Tang | H04L 45/02 |
| | | | 370/432 |
| 2010/0208662 A1 * | 8/2010 | Fuste Vilella | H04L 45/02 |
| | | | 370/328 |
| 2014/0064275 A1 * | 3/2014 | Hammer | H04L 45/74 |
| | | | 370/392 |
| 2016/0337264 A1 * | 11/2016 | Murashko | H04L 67/63 |
| 2018/0006931 A1 * | 1/2018 | Ellis | H04L 43/0852 |
| 2019/0034298 A1 | 1/2019 | Maskalik et al. | |
| 2019/0331727 A1 * | 10/2019 | Benoit | G01R 31/086 |
| 2020/0028758 A1 * | 1/2020 | Tollet | H04L 45/586 |
| 2020/0067734 A1 | 2/2020 | Hira et al. | |
| 2020/0067982 A1 | 2/2020 | Leach et al. | |
| 2020/0104161 A1 | 4/2020 | Kapur et al. | |
| 2020/0183905 A1 | 6/2020 | Wang et al. | |
| 2020/0259892 A1 * | 8/2020 | Magnezi | H04L 67/1006 |
| 2021/0014113 A1 | 1/2021 | Guim Bernat et al. | |
| 2021/0124758 A1 | 4/2021 | Bottari et al. | |
| 2021/0184983 A1 | 6/2021 | Ramaswamy et al. | |
| 2021/0297925 A1 | 9/2021 | Berzin et al. | |
| 2022/0345386 A1 * | 10/2022 | Madanapalli | A63F 13/67 |

OTHER PUBLICATIONS

U.S. Appl. No. 17/125,746, "Notice of Allowance", Oct. 31, 2022, 9 pages.

* cited by examiner

CROSS DATACENTER COMMUNICATION USING A MESH GATEWAY

CROSS-REFERENCE TO RELATED APPLICATIONS

This application is a continuation of U.S. patent application Ser. No. 17/125,746, filed on Dec. 17, 2020, entitled "CROSS DATACENTER COMMUNICATION USING A MESH GATEWAY", the contents of which is incorporated by reference herein in its entirety.

TECHNICAL FIELD

This disclosure generally relates to techniques for cross datacenter communication between web services using mesh gateways. Specifically, the present disclosure provides a technique to configure gateways with optimal routes to target datacenters in order to enable cross datacenter communication.

BACKGROUND OF THE INVENTION

A software application may span multiple web-services within different data centers. Securely connecting these web-services associated with multiple run-time platforms or environments involves complex and costly configurations between the services. Spanning web-services within different clouds, a cloud within datacenter, and connections between a modern scheduler and virtual machines also require a careful network and security configuration.

Typically, web-services within different environments are connected using a point to point VPN connection. VPN uses a public network infrastructure, by means of tunneling technology to achieve data security transmission of similar private network. Correctly configuring and operating VPN tunnels to establish point to point VPN connections within multiple platforms or environments is a costly and complex process.

While a technique that allows service discovery across datacenter boundaries by differentiating between WAN and LAN addresses of a service and automatically using the WAN addresses for a direct connection between web-services exists, this technique does not ensure that subnets between two environments do not overlap. Additionally, this approach also requires established VPN set-up between environments.

Typically, after the VPN connection is established, a host within a local gateway within a datacenter connects to a host within a remote gateway through the secure VPN tunnel. A connection consists of the IP addresses and host names of the two gateways, the subnets behind them, and the shared secrets for the two gateways to authenticate to each other. When thousands of users access applications, defining policies and synchronizing them across different locations is a complex task. In addition, deploying, configuring and managing VPNs in tens or hundreds of cloud instance is expensive, time-consuming and risky.

While there are numerous techniques for service-to-service communication within different environments, a simple solution for service-to-service communication using optimal network routes that solves the various networking problems and complexities that arise in multi-cloud, multi-cluster, multi-platform, hybrid-cloud environments is not available. Accordingly, there is a need for a framework that enables efficient cross datacenter service-to-service communication using an optimal network route.

BRIEF SUMMARY OF THE INVENTION

The present disclosure describes techniques for cross datacenter service-to-service communication using one or more mesh gateways. Various embodiments are described herein, including methods, systems, non-transitory computer-readable storage media storing programs, code, or instructions executable by one or more processors, and the like. Embodiments of the invention add a new concept for connecting to one or more datacenters using "Mesh Gateway(s)" to solve the various networking problems and complexities that arise in multi-cloud, multi-cluster, multi-platform, hybrid-cloud environments. For the sake of brevity any mention of "gateway" later in this disclosure refers specifically to a mesh gateway.

In an example embodiment, a mesh gateway may receive a protocol message directed to a service within a target datacenter. The mesh gateway may sniff into the protocol message to identify information indicating the destination address of the service and the target datacenter. The destination hostname of the service can be within a SNI header of the protocol message. In the above embodiment, the protocol message may be a part of a Transport Layer Security (TLS) Server Name Indication (SNI) handshake originated from a client service.

In certain embodiments, the mesh gateway may extract from the protocol message information relating to the routing configuration for routing the protocol message to the service. The routing configuration for routing the protocol message may be single-hop routing or multi-hop routing. The mesh gateway may determine a network route for routing the protocol message to the service based on the routing configuration.

In an example embodiment, if the routing configuration for routing the protocol message is configured to be single-hop mesh gateway routing, the gateway may further determine whether the gateway has a direct connection to the target datacenter. In the above embodiment, if the mesh gateway has direct connection to the target datacenter, the mesh gateway uses the direct connection as a network route to route the protocol message to the target datacenter.

In an alternate embodiment, if the routing configuration for routing the protocol message is set to single-hop routing and there is no direct connection to the target datacenter, the mesh gateway may determine a distance(s) to one or more next-hop datacenter(s) directly accessible by the mesh gateway. The mesh gateway may also determine distance(s) to the target datacenter as advertised by the next-hop datacenter(s).

In the above embodiment, the mesh gateway may calculate total distance(s) to the target datacenter based on the distance(s) to the next-hop datacenter(s) and the distance(s) as advertised. The mesh gateway may further use a network route with a shortest total distance to the target datacenter, selected from the available network routes to the target datacenter.

In certain embodiments, if the routing configuration configured for routing the protocol message is multi-hop routing, the gateway may determine distance(s) to next-hop datacenter(s) from the gateway. The distance(s) to the next-hot datacenter(s) may be determined using network coordinates of the datacenter associated with the first gateway device and the next-hop datacenter(s).

In the above embodiment, the mesh gateway may further determine distance(s) to the target datacenter as advertised by next-hop datacenter(s). The mesh gateway may further calculate total distance(s) to the target datacenter based on the distance(s) to the next-hop datacenter(s) and the distance (s) as advertised. In the above embodiment, the gateway device identifies a network route with a shortest total distance to the target datacenter from the calculated total distance(s).

In an example embodiment, the mesh gateway may filter a reference to the mesh gateway (itself) from the network route for routing the protocol message to the target datacenter. Filtering the gateway from the network route may prevent traffic to be routed using cyclical routes. In certain embodiments, after network route has been determined, the mesh gateway forwards the protocol message to another gateway device within the target datacenter by transmitting the protocol message through the determined network route.

In the above embodiment, the gateway may use at least one of a Local Area Network (LAN) address and a Wide Area Network (WAN) address to route the protocol message to the service within the target datacenter. In the above embodiment, the gateway may use either layer 4 or layer 7 load balancing protocols for routing the protocol message. These illustrative embodiments are mentioned not to limit or define the disclosure, but to provide examples to aid understanding thereof Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION OF THE INVENTION

Figure 1:
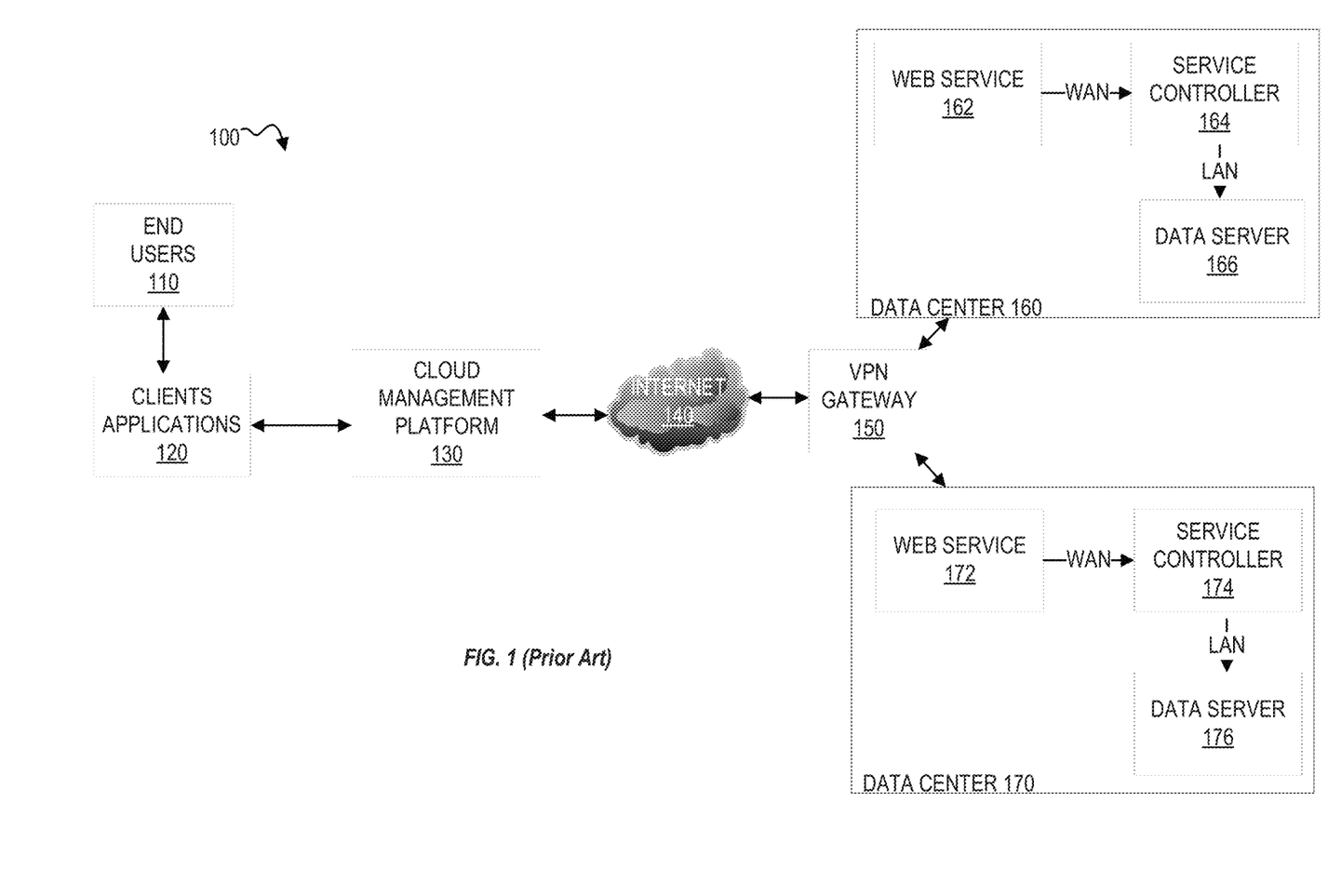
FIG. 1 depicts an example of a conventional cross datacenter service-to-service communication using a VPN gateway.

FIG. 1 depicts a conventional method of network communication that includes end users 110, client applications 120, cloud management functionality 130, internet 140, VPN gateway 150, data center 160, web service 162, service controller 164, data server 166, data center 170, web service 172, service controller 174, and data server 176. In an example embodiment, end users 110 may connect to one or more client applications 120. End users may access one or more client applications 120 via computing devices such as a smartphones, laptops, desktop computers, tablets, etc.

In an example embodiment, one or more client applications 120 consists of software and/or hardware that relies on cloud computing for application delivery. In an example embodiments, a client application may be a web browser, a mobile application, or a web application. In an example embodiment, client applications 120 may issue a request to the cloud management platform 130 to access cloud computing resources.

In an example embodiment, the cloud management platform 130 may manage deployment and operations associated across multiple cloud service infrastructures (e.g., web service 162 and web service 172). In above embodiment, the cloud management platform 130 may allow one or more client applications to use web service 162 within data center 160 and web service within data center 170 using VPN gateway 150.

A typical VPN gateway 150 enables communication between one or more web services (e.g., service 162 and service 172) within different datacenters or the same datacenter using a VPN infrastructure. VPN infrastructure enables secure network communication between multiple services within one data center or between multiple data centers (data center 160 and data center 170) using VPN tunnels between services.

In an example embodiment, network traffic traveling between datacenter would be encrypted by originator service 162 and decrypted by the receiver service 172. More specifically, Internet Protocol Security (IPsec) VPN tunnels are used for communication between datacenters. Once a VPN connection is established, hosts behind the local gateway within datacenter 160 connect to hosts behind a remote gateway within the datacenter 170 through the secure VPN tunnel (VPN gateway 150). In an example embodiment, a VPN gateway 150 may be built into the cloud management platform 130.

Figure 2A:
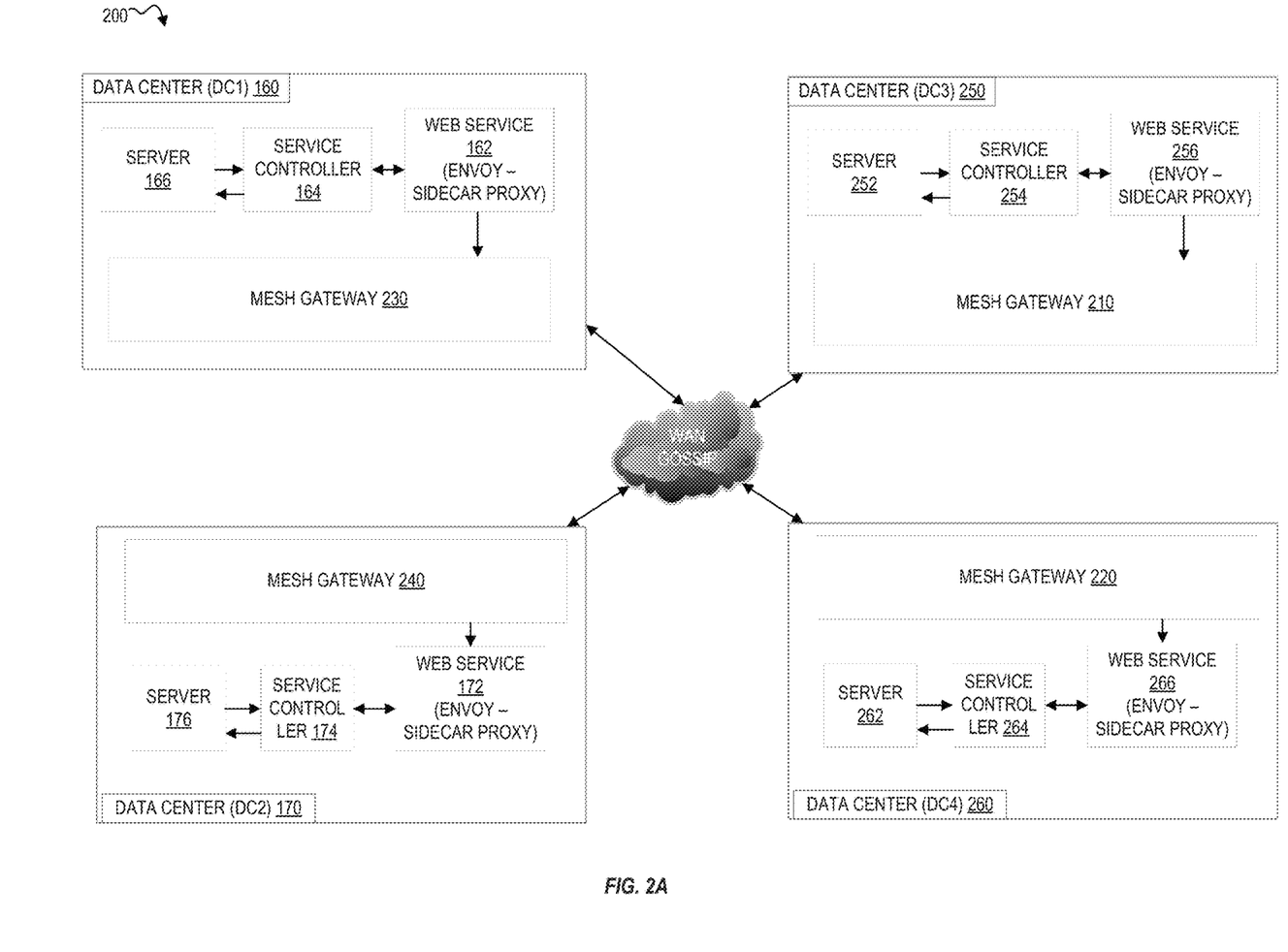
FIG. 2A depicts an example of a cross datacenter service-to-service communication using a mesh gateway and WAN Gossip in accordance with certain embodiments.

FIG. 2A depicts an example of a cross datacenter service-to-service communication using one or more mesh gateways within datacenters. In an example embodiment, when a service 162 needs to communicate with service 172 which is located in a different physical datacenter 170, the traffic may be proxied securely through the mesh gateway 230. In the above embodiment, the mesh gateway forwards the traffic to the correct destination service 172.

In the above embodiment, each mesh gateway (e.g., 210, 220, 230, and 240) may route to all other datacenter they are aware of that contain a mesh gateway. In the above example embodiment, a datacenter (160) may discover the other datacenter (170) through a WAN (Wide Area Network) federation. The WAN federation allows servers in different datacenters to be federated exclusively through mesh gateways. With WAN federation, all servers in first datacenter may be directly connectable over their WAN-advertised network address from servers in a second datacenter where both first and second datacenters are part of a multi-datacenter cluster.

In an example embodiment, because the traffic between datacenter 160 and datacenter 170 is proxied by the mesh gateways (230 and 240), a web-service 162 does not need a direct connection to the destination service 172. In an example embodiment, the web service 162 needs access only to mesh gateway 230 in order to establish communications with entities outside its datacenter 160.

In an example embodiment, the mesh gateway 230 does not have to access a destination server certificate of or keys to service 172. In the above embodiment, gateway 230 may use Transport Layer Security (TLS) communication protocol extension Server Name Indication (SNI) to communicate with service 172.

In an example embodiment, during the TLS handshake between services 162 and 172, service 162 may send a destination (e.g., service 172) hostname in the SNI header that is part of the TLS handshake. In an example embodiment, gateway 230 may peek at the first message of the handshake and read the SNI header. The SNI header may describe a specific service (e.g., service 172) that is being requested or a subset of an instance of the service (e.g., service 172) using a pre-configured name. Accordingly, gateway 230 determines the destination without having to decrypt and re-encrypt the traffic between service 162 and service 172.

In an example embodiment, gateway 230 may further proxy the encrypted traffic from service 162 to service 172 at network transport layer L4. In the above embodiment, this approach allows service end to end TLS connection without decrypting the traffic flow even if gateway 230 is compromised.

In an example embodiment, mesh gateway 230 may be an ingress and/or egress type of gateway. In the above embodiment, mesh gateway 230 may accept incoming connections (e.g., from service 172) on a public interface and proxy them to services within its datacenter 160. In an example embodiment, datacenter 160 includes more than one service (e.g., service 162). Ingress type gateway 230 may direct incoming traffic to these services.

In an example embodiment, gateway 230 may be an egress type gateway that accepts incoming connections from services (e.g., service 162) within its datacenter 160 and proxies the traffic to the ingress type gateway of the target data center. In an example embodiment, as depicted in FIG. 2, if gateway 230 is an egress type gateway that accepts incoming connections from service 162 to connect to service 172, the gateway 230 may proxy the traffic to gateway 240, where the gateway 230 may be federated to connect to the gateway 240 within the datacenter 170 using a WAN gossip pool. The WAN gossip pool may include a list of server members from different datacenters within a cloud cluster (e.g., cluster of datacenters) where the server members of the gossip pool are interconnected. In the above embodiment, gateway 240 may be an ingress type gateway that accepts incoming connections (e.g., from service 162) on a public interface and proxy them to services within its datacenter 170.

In an example embodiment, egress type gateway 230 may allow cross datacenter communication without requiring sidecar proxies (e.g., sidecar proxy 271) of service 162 to be aware of any routing of the datacenter 160 even when they may need to make requests to datacenter 170. In the above example, egress gateway 230 may be responsible for keeping track of the external data centers and services. Additionally, egress gateway 230 may provide better load balancing because when gateway 230 is used by multiple sidecar proxies, it has more knowledge about overall traffic to better spread the load.

In an example embodiment, gateway 230 may be an intermediate type gateway that combines functionalities of both ingress and egress type gateways. This type of combined gateway may accept connections from a public interface and may proxy them to other ingress gateways or other intermediate gateways within other datacenters. Intermediate gateways may exist in a federated network where all datacenters don't have a direct connection to all other datacenters.

In an example embodiment, the gateway 230 may be an ingress, egress, and intermediate type gateway. In an example embodiment, the gateway 230 may be an intermediate type gateway that is used for all communications within a single datacenter 160. In the above embodiment, within datacenter 160 each sidecar proxy within service 162 may not be required to load balance connections to services independently. Instead the sidecar proxies may use the gateway 230 to load balance connections since it has much more knowledge of overall traffic throughout the cluster. Accordingly, the gateway 230 may make better routing decision than sidecar proxies.

In an example embodiment, a gateway 230 may be configured within datacenter 160. After configuration of gateway 230, gateway 230 may be registered and enabled in the datacenter 160. In an example embodiment, once the gateways 230 and 240 are enabled, sidecar proxies associated with web services 162 and 172 may reconfigured automatically to send their traffic to gateways 230 and 240 in the local datacenter which will then route to gateways in the remote datacenters and remote destination services. In the above embodiment, the web service 162 and service 172 are instances of two different web services.

In an example embodiment, once the gateway 230 is enabled, services within datacenter 160 are also configured to take advantage of gateway 230. In the above embodiment, services within datacenter may have list of configured upstreams (e.g., connections to other services). In an example embodiment, one or more of upstream are configured to use the gateway 230. In the above embodiment, the gateway 230 may modify the destination of the original outgoing request to other service. Accordingly, service proxies associated with services (e.g., service 162) may be configured to make their TCP connection to the gateway 230 instead of the upstream connection to the final service destination.

In an example embodiment, a new field "mesh gateway" may be added to the upstream configuration of the one or more web services within the datacenter. A setting in the upstream configuration for services may indicate whether a gateway should be used and the desired behavior. In the above embodiment, the upstream configuration for a service (e.g., service 162) may be stored and managed by the sidecar proxy (e.g., sidecar proxy 271) associated with a service (e.g., service 162). In an example embodiment, the mesh gateway field may have one of the four values: 1) the empty string (" ") may represent the default gateway usage and allows overriding this setting from a global service configuration, 2) the string "none" explicitly disables using gateways for the upstream, 3) the string "remote" enables a proxy to utilize a direct connection to an ingress gateway in a remote datacenter for the upstream, and 4) the string "local" enables the proxy to utilize an egress gateway within the local datacenter for the upstream.

In an example embodiment, when the gateway 230 is enabled, upstreams associated with service 162 may be configured differently. When the gateway 230 is enabled, an upstream endpoint (e.g., destination service 172) may be set to an address of a gateway (e.g., gateway 230) instead of an address associated with a destination service (e.g., service 172). In an example embodiment, depending upon the upstream's configuration, an ingress gateway in remote datacenter (e.g., 170) or an egress gateway (e.g., 230) within the local datacenter (e.g., 160) may have direct connection to the service's proxies.

In an example embodiment, along with changing the upstream's target address, SNI context may be added to the upstream for the connection to be routed appropriately. For egress and intermediate type gateways, whether upstreams are configured to point at an ingress gateway in remote datacenter, proxies of egress/intermediate gateway do not require any changes. All the proxies may need to know is the next hop address to make TCP connections.

In the above embodiment, a gateway (230) may be implemented using a configured envoy proxy. In an example embodiment, for egress type gateway 230, an envoy may sniff SNI header within service 162 and transmit the encrypted data to correct destination (e.g., service 172) using a TCPproxy or SNI cluster network filter (e.g., network filter that uses the SNI values in a TLS connection as the upstream cluster name). Once the destination is identified by sniffing the SNI header during the initial TLS handshake, the rest of the stream may stay encrypted during the transmission.

As discussed in the above embodiment, the SNI header may be sniffed during the initial TLS handshake to retrieve destination information. For egress type gateway 230, a destination may be identified by matching domain suffixes in the TLS SNI header to those configured for other datacenters. In an example embodiment, for an egress type gateway 230, once the sniffed SNI information is matched to an external datacenter, the gateway 230 transmits the message or packet to the destination service within the external datacenter or to a next-hop gateway to transmit the packet to destination. In above embodiments, the SNI sniffing and routing mechanisms for both egress and ingress type of gateway transmissions are identical.

In an example embodiment, destination information or server names within the SNI header may be specified as a fully qualified domain name having the following format.
<subset>.<service>.<namespace>.<datacenter>.<internal?>.<trust domain>

In an example embodiment, a destination information for a service in DC2 170 in the above format may be described as follows.
v 1.web.default. dc2.int.55084bf6-fb26-4d75-b812-91f5de1c7335.consul In the above example embodiment, the <subset> name may be defined in a service-resolver configuration entry field for a cloud networking infrastructure such as Consul® by HashiCorp Inc. The service-resolver configuration entry is stored by the Consul servers (through Raft). Consul will use this configuration entry to generate the gateways configuration which will route the subset accordingly. The proxy itself is unaware of the configuration entry Additionally, the string contains a service name after the subset name. In an example embodiment, a namespace may identify the service. In the above example, the namespace is set to default. Additionally, the string may include the name of the datacenter (e.g., DC2) the service is residing within.

In an example embodiment, a gateway 230 may have three types of addresses: a LAN address, a WAN address, and one or more tagged addresses. Configuring tagged addresses and the LAN/WAN address establishes how everything else talks to that gateway 230. In some implementaionts, a single agent can manage multiple gateways regardless of their address configuration. Gateway 230's LAN address is used by all services in DC 160 to do egress out of the DC through the Gateway. Its WAN address is used by default by all gateways residing in other datacenters when they need to send traffic into DC 160 from services in their own datacenters. The tagged addresses idea here would allow for advertising a different IP for individual datacenters to use. For example with the tagged address of dc:DC3 (element 250), then gateway 210 would use this tagged address when sending service traffic to DC1 160. This address would be ignored by gateways 240 and 220, which will still use the WAN address of gateway 230 to send traffic to DC1 160.

Specifically, in an example embodiment, gateway 230 may be implemented in one or more phases. Initially, the tagged address may not be added. The gateway 230 may be contacted over a WAN address. This arrangement may allow an agent (e.g., 273) to manage a single gateway (e.g., 230) or multiple gateways, and force the gateway to reside on a same network namespace as the agent. In the next phase, tagged addresses may be added to the gateway 230. Accordingly, the tagged address may now allow a single agent (e.g., 273) within a datacenter (DC1 160) to manage multiple gateways (e.g., gateway 230) and allow the gateways to use a separate network from the agent.

In an example embodiment, an agent (e.g., 273) within a data may use an xDS (Extended Data Service)/ADS (Aggregated Discovery Service) protocol to configure the gateway 230. A local agent (e.g., 273) within the datacenter may perform queries against a catalog to discover all mesh gateway instances in each potential target datacenter. For each of the datacenters, the gateway may be configured to route connections destined for or through that datacenter to the discovered mesh gateway instances.

In an example embodiment, an ingress type gateway may be configured with one or more public listeners that has a tls inspector listener filter enabled as well as the sni cluster and tcpproxy network filters enabled. TLS Inspector listener filter allows detecting whether traffic flow (e.g., including protocol message) appears to be TLS or plaintext, and if it is TLS, it detects the Server Name Indication and/or Application-Layer Protocol Negotiation associated with the traffic. The sni cluster within the gateway 230 is a network filter that uses an SNI field in a TLS connection as the upstream cluster name (e.g., DC2 170). For example if there is a service "web" (e.g., service 172) and the gateway 240 is proxying connections for "dc2" then a cluster name that starts with web. deˉFault.dc2 will be configured with load balanced endpoints corresponding to each service instance of "web" within "DC2."

The TCP proxy filter within the gateway 230 performs basic 1:1 network connection proxy between downstream clients (e.g., clients within DC1 160) and upstream clusters (e.g., services within DC2 170). The TCP proxy filter may within gateway 230 also respect the connection limits imposed by each upstream cluster. The TCP proxy filter checks with the upstream cluster's resource manager if it can create a connection without going over that cluster's maximum number of connections, if it can't the TCP proxy will not make the connection.

The following code may be used to set up the listener and network filters within the gateway 230:

```
"Service": "gateway-service",
"Port": 8443,
"Kind": "mesh-gateway",
"Address": "172.16.0.1",
"TaggedAddresses": {
    "lan": {
```

-continued

```
        "address": "172.16.0.1",
        "port": 8443,
      },
      "wan": {
        "address": "198.18.0.1",
        "port": 8443,
      },
      "dc:dc3": {
        "address": "198.18.20.3",
        "port": 8443,
      }
    }
  }
}
```

In an example embodiment, egress and intermediate gateways may be configured in similar manner. Within the gateway 230, endpoints of the target cluster (e.g., DC2 170) may be configured as the addresses of ingress gateways (e.g., gateway 240) servicing the target datacenter. In an example embodiment, both the ingress and egress parts for an intermediate gateway may be configured together. In an example embodiment, gateways 230 and 240 may be compatible with L7 routing.

The following code may be used to set up the egress type gateway.

```
static resources:
listeners:
-  name: sni automatic
   address:
   socket address:
   address: 1.2.3.4
   port value: 443
   Listener filters:
   -  name: envoy.listener.tls inspector
   typed config:
      filter chains:
      -  filter chain match:
      server names: ["*.dcl"]
         filters:
         - name: envoy.tcp proxy
         config:
            stat prefix: tcp.proxy.dcl
            cluster: dcl
```

In an example embodiment, a Remote Procedure Call (RPC) by services within the datacenter may be used to discover gateways in the datacenter. In an example embodiment, to discover all gateways for a datacenter, a RPC endpoint may be modified to take a specific "kind" of service (e.g., gateway service) and only return the services for that kind. The following code shows an example of configuration for a gateway service.

configuring a gateway service with this name
service "gateway-name" {
policy="write"
kinds=["mesh-gateway"]}

As discussed in the above example, a "kinds" variable is set to "mesh-gateway" for gateway services within the datacenter. Accordingly, all gateways within the datacenter may be discovered by finding services for which "kinds" is set to "mesh-gateway." The service definition will be updated so the various catalog endpoints may be able to handle gateways but the APIs for definition itself would be unaltered.

As shown in FIG. 2A, in an example embodiment, all server nodes in each datacenter (e.g., servers 166, 176, 252, and 262) may gossip with all the server nodes in every other data center (e.g., servers 166, 176, 252, and 262). In the above embodiment, through the use of a gossip protocol, the servers (166, 176, 252, and 262) may determine a list of all connected servers and all connected datacenters via WAN gossiping. In an example embodiment, the gossip protocol may be a Scalable Weakly-consistent Infection-style Process Group Membership (SWIM) type protocol. The gossip protocol may provide the server (e.g., server 166) a view of health and location of every other server across the Wan Area Network (WAN).

The above embodiment, the method of WAN federation or gossip requires full WAN connectivity from every server with every other server in all datacenters. In this mode, all server nodes in each datacenter (e.g., server 166, server 176, etc.) may gossip with all the server nodes in every other datacenter (e.g., server 166, server 176, etc.).

In the above embodiment, through the use of a protocol, the server(s) may determine a list of all connected servers and determine list of all connected datacenters. This method may require full WAN connectivity from every server with every other server in all datacenters. In an example embodiment, for datacenter communication between datacenters 160 and 260, WAN connectivity between both datacenters 160 and 260 is required.

Figure 2B:
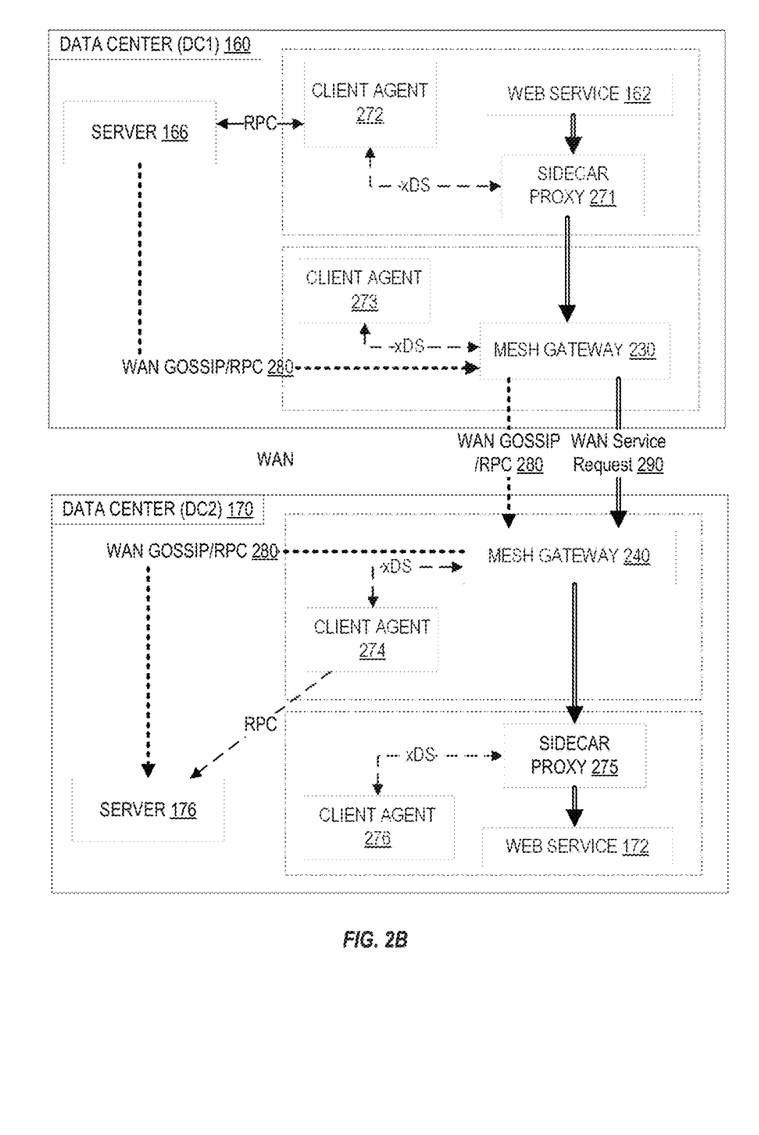
FIG. 2B depicts an example of a block diagram showing interactions between components within the first and second datacenters for cross datacenter communication.

FIG. 2B depicts an example of a block diagram showing interactions between components within the first and second datacenters for cross datacenter communication. Specifically, the block diagram shows cross datacenter communication between services 162 and 172. In an example embodiment, service 162 may be an instance or subset of a web service. In an example embodiment service 172 may be an instance or subset of a different web service. In an example embodiment, as discussed, when a service 162 needs to communicate with service 172, which is located in a different physical datacenter 170, the traffic may be proxied securely through the mesh gateways 230 and 240.

In an example embodiment, the web service 162 may be connected to a sidecar proxy 271 and client agent 272. The mesh gateway 230 may be connected to a different client agent 273 and server 166. The sidecar proxy 271 and mesh gateway 230 may communicate with their client agents (e.g., 272 and 273) using a xDS (service discovery) proxy configuration protocol. Client agents 272 and 273 may use Remote Procedure Call (RPC) to discover a global state of the cluster in order to produce the configuration for mesh gateway 230 and sidecar proxy 271.

In an example embodiment, the servers (e.g., server 166) may issue remote procedure calls to other servers (e.g., server 176) to query specific availability information for services (e.g., service 172) in that datacenter (e.g., datacenter 170), in order to configure gateway routes correctly. In an example embodiment, as shown in FIG. 2B, link 280 shows server-server communication flow using RPC calls.

In an example embodiment, link 290 of FIG. 2B, shows the flow of a service request from service 162. A service request for a target service (e.g., service 172) may be sent from service 162 to sidecar proxy 271 of the service 162. The service request 290 may be forwarded to the mesh gateway 230. The gateway then forwards the request 290 to mesh gateway 240 (e.g., the gateway associated with the datacenter of the target service). The mesh gateway 240 may communicate the request 290 to target service 172 through sidecar proxy 275.

Figure 3:
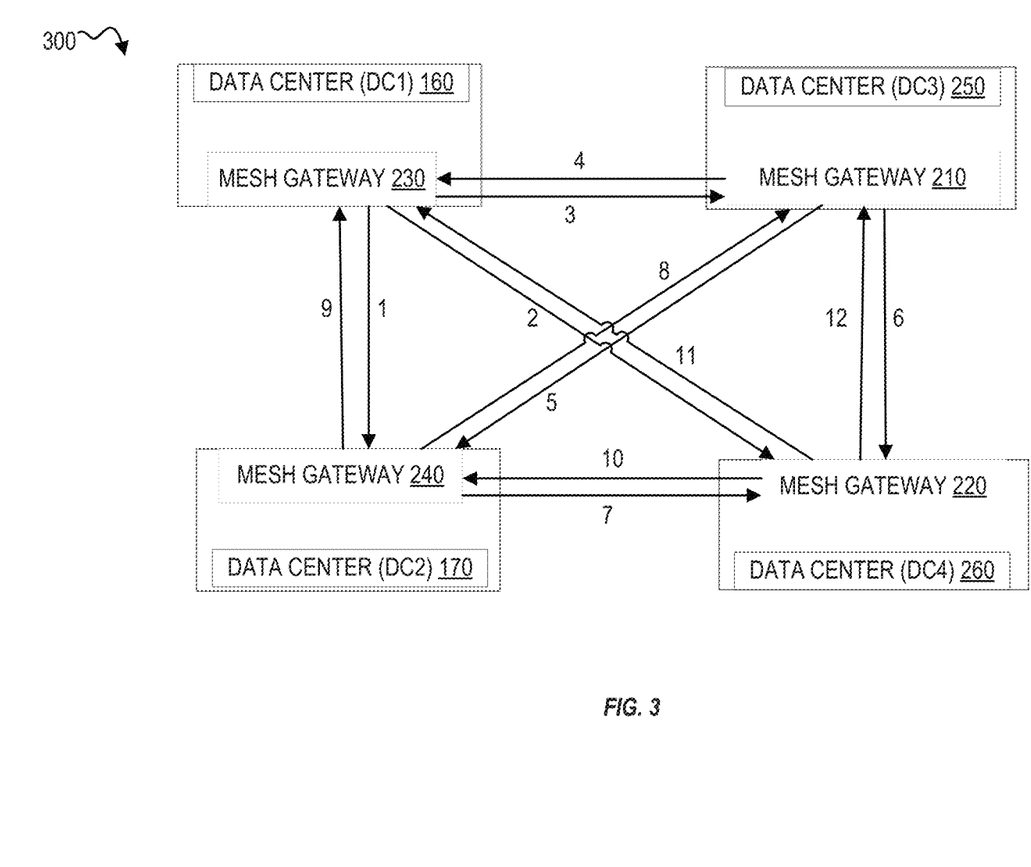
FIG. 3 depicts an example of a cross datacenter service-to-service communication using mesh gateway routing without using network area connections in accordance with certain embodiments.

FIG. 3 depicts an example of a cross datacenter service-to-service communication using mesh gateway routing without using network area connections in accordance with certain embodiments. As disclosed in the above embodiment describing FIG. 2A, after the servers have determined a list of datacenters, mesh gateways within the datacenters can be configured with routes to all other datacenters. In an example embodiment, the routes to other datacenters are all direct or single-hop routes where a mesh gateway in the final destination datacenter routes the traffic (e.g., protocol messages) internally within that datacenter.

In an example embodiment, as shown in FIG. 3, four datacenters (DC1 160, DC2 170, DC3 250, and DC4 260) all have mesh gateways. Each mesh gateway within the four datacenters may be configured with three direct routes. In the above embodiment, each of the three routes is for each of the three datacenters. In an example embodiment, as shown in FIG. 3, routes 1, 2, and 3 are direct routes from DC1 to DC2, DC4, and DC3. Similarly, routes 4, 5, and 6 are configured direct links from DC3 to DC1, DC2, and DC4. Routes 7, 8, and 9, as disclosed in FIG. 3 provide direct connection from DC2 to DC4, DC3, and DC1 as well as routes 10, 11, and 12 provide direct connection from DC4 to DC2, DC1, and DC3.

In an example embodiment, each datacenter (DC1 160, DC2 170, DC3 250, and DC4 260) may contain more than one mesh gateway. In the above embodiment, the traffic may be divided between multiple mesh gateways within a single datacenter for routing the traffic to other connected datacenters. This arrangement may further involve load balancing connections between multiple gateways within a singular datacenter. In an example embodiment, a sidecar proxy (e.g., 271 as shown in FIG. 2B) may be configured with all peer gateways it can use within the data center (e.g., gateway 230). The sidecar proxy may select a gateway from all of the peer gateways based on its configured load balancing algorithms such as Round Robin or Least Connections.

Figure 4:
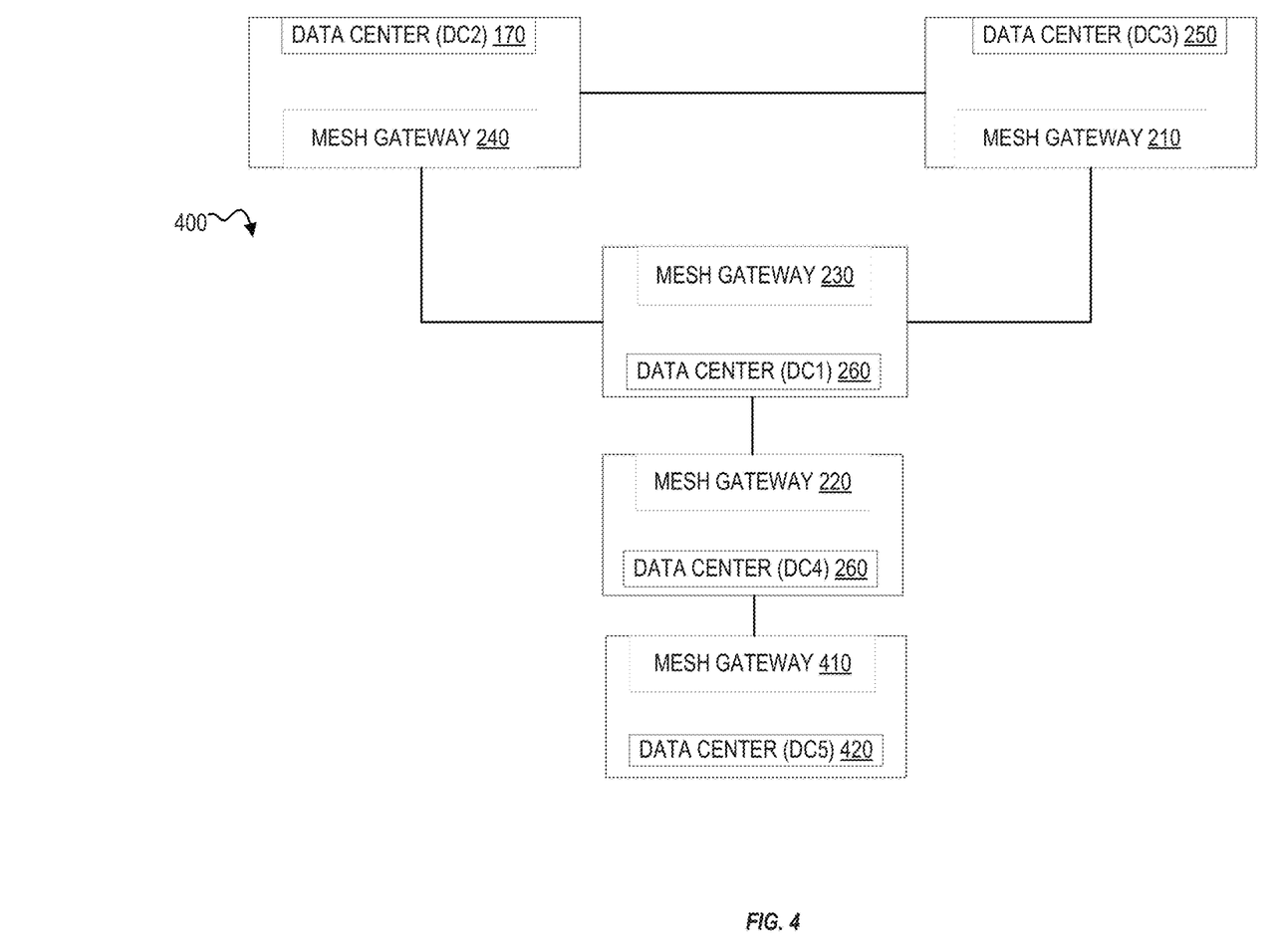
FIG. 4 depicts an example of cross datacenter service-to-service communication pairwise groups of datacenter connections.

FIG. 4 depicts an example of cross datacenter service-to-service communication using pairwise groups of datacenter connections. In an example embodiment, as shown in FIG. 4, instead of a WAN federation, network area (e.g., Local Area Network (LAN) or Wide Area Network (WAN)) connections may be used to create pairwise groups of datacenter connections. The configuration disclosed in the above embodiment, as shown in FIG. 4, allows only selective network reachability between the datacenters.

As shown in FIG. 4, network areas may be set up between DC1 (160) and DC2 (170), DC1 (160) and DC3 (250), DC1 (160) and DC4 (260), DC2 (170) and DC3 (250), and DC4 (260) and DC5 (420). In the above embodiment, because there is no network area configured between DC1 and DC5, these two datacenters will be unaware of each other. Accordingly, DC1 may not communicate with DC5. Similarly, other datacenters in FIG. 4 that do not have direct connection between them will be unaware of each other. However, DC1 may communicate with DC2 and DC3. In the above embodiment, accordingly, the mesh gateways deployed in each datacenter may not have routes to all datacenters but only the subset of those datacenters of which the datacenters are aware.

Figure 5:
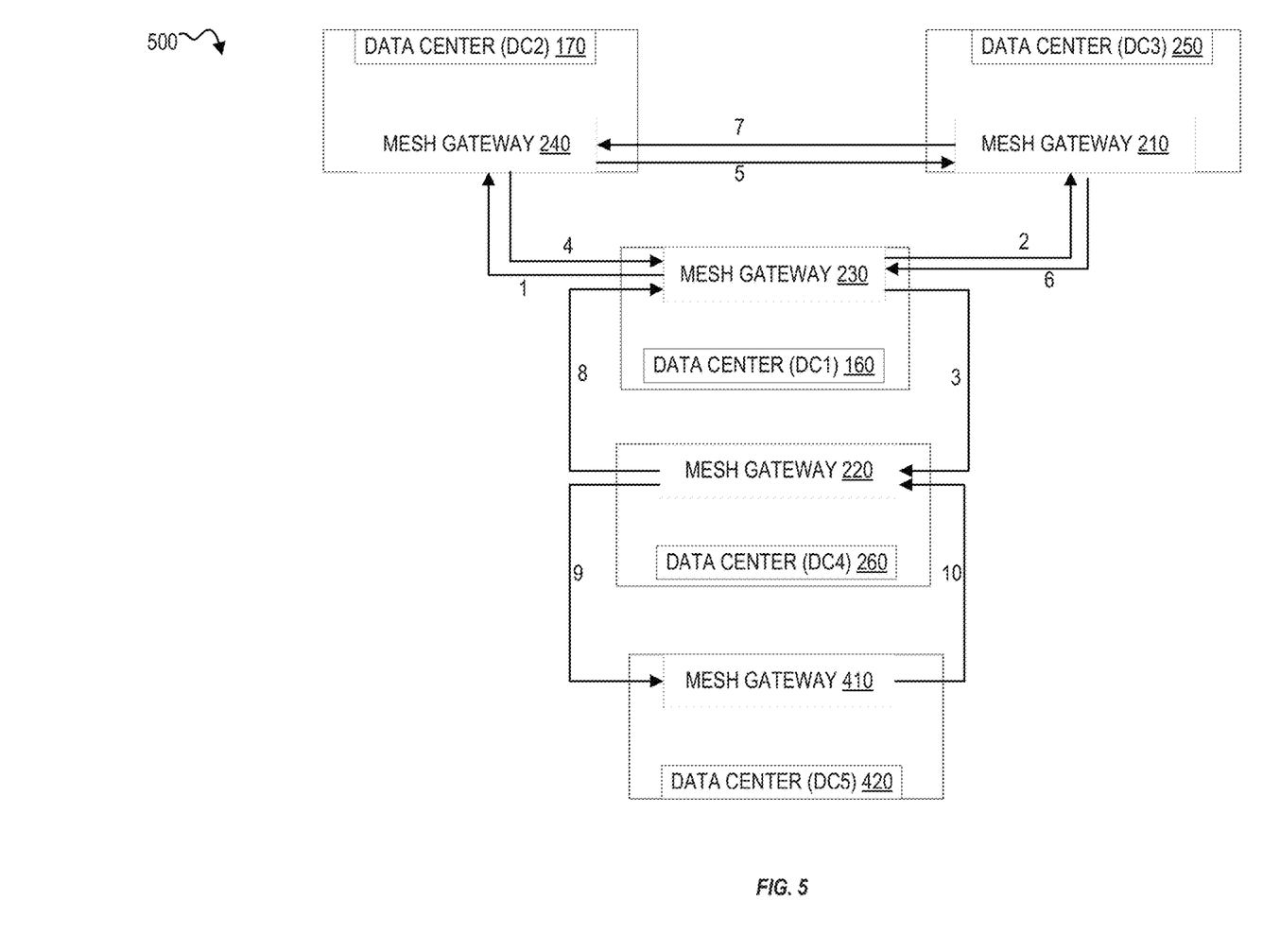
FIG. 5 depicts an example of cross datacenter service-to-service communication via mesh gateway using routes configured for the mesh gateway.

FIG. 5 depicts an example of cross datacenter service-to-service communication via mesh gateway using routes configured for the mesh gateway. As shown in FIG. 4, DC1 (160) and
DC2 (170), DC1 (160) and DC3 (250), DC1 (160) and DC4 (260), DC2 (170) and DC3 (250), and DC4 (260) and DC5 (420) may be connected using network areas. Mesh gateways within these datacenters may be configured with network area routes (LAN or WAN IP addresses) to communicate between services within connected datacenters.

In an example embodiment, as shown in FIG. 5, mesh gateway routes for DC1 include 1, 2, and 3. Similarly, a mesh gateway routes for DC2 are 4 and 5, mesh gateway route for DC3 are 6 and 7, mesh gateway routes for DC4 are 8 and 9, and mesh gateway routes for DC5 are 10. As shown in FIG. 5, services within DC1 (160) may communicate to services within DC2 (170), DC3 (250), and DC4 (260). However, due to the lack of a route between DC3 and DC4 as well as between DC1 and DC5, services in those datacenters may not be able to communicate with each other.

Figure 6:
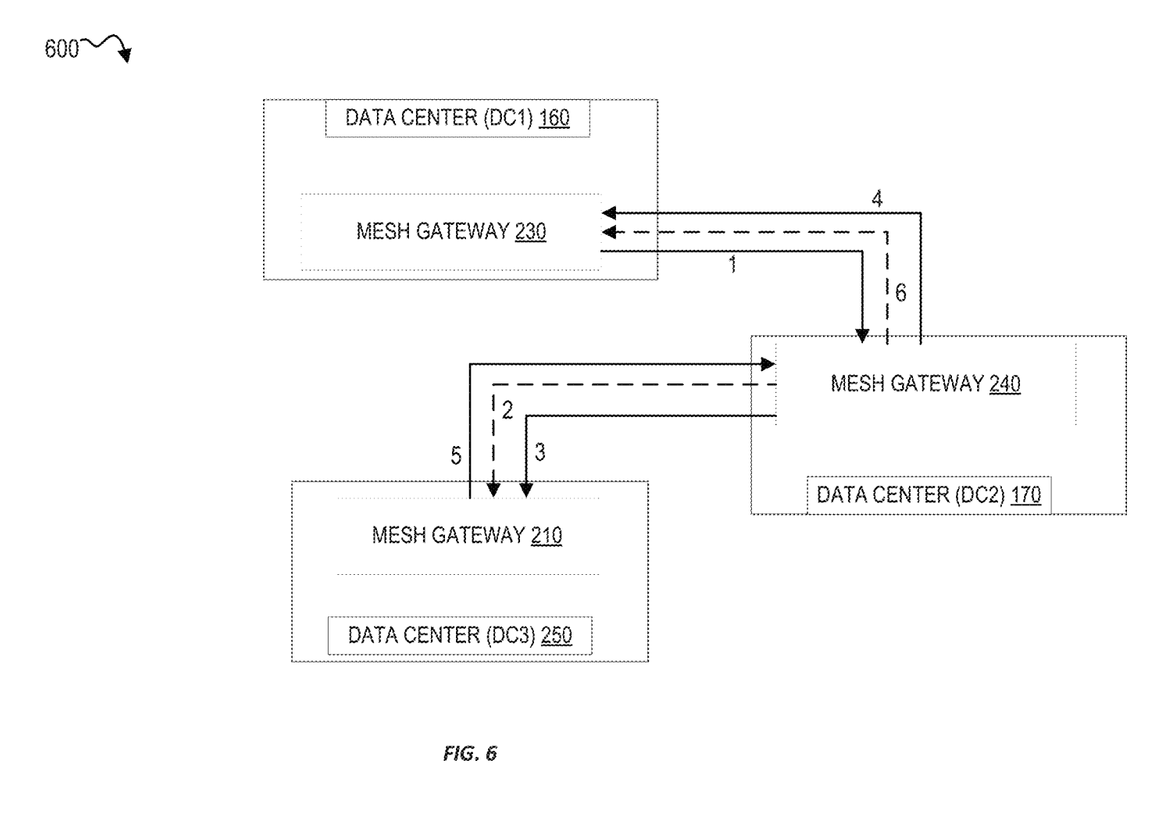
FIG. 6 depicts an example of cross datacenter service-to-service communication via multi-hop mesh gateways between three datacenters.

FIG. 6 depicts an example of cross datacenter service-to-service communication via multi-hop mesh gateways between three datacenters. As shown in FIG. 6, cross datacenter communication via mesh gateways and network areas may be extended to provide multi-hop routing between datacenters. In an example embodiment, as shown in FIG. 6, mesh gateways within datacenters may be configured with routes to connected datacenters similar to the embodiment discussed in FIG. 5.

In the above embodiment, along with the direct route configuration, servers in each datacenter may advertise the other datacenters that the servers may have knowledge about in addition to their own datacenters. In the above embodiment, as shown in FIG. 5, mesh gateways may be configured with the ability to route to each known datacenter except for the route the mesh gateways may target a mesh gateway in a next-hop datacenter. In an example embodiment, next-hop datacenter may act as a point to point interface.

As shown in FIG. 6, the mesh gateway 230 in DC1 160 may be configured with the ability to route the traffic to DC3 but instead of making a direct connection, it may make the connection to a mesh gateway 240 in DC2 170 which would then forward it along to DC3 250. As shown in FIG. 6, connection 1 between mesh gateway 230 and mesh gateway 240 is a direct route between DC1 and DC2. However, connection 2 between mesh gateway 240 and mesh gateway 210 is a part of multi-hop route (connections 1 and 2) from DC1 to DC3.

In an another embodiment, as shown in FIG. 6, mesh gateway 210 in DC3 250 may be configured with the ability to route the traffic to DC1 but instead of making a direction connection, it may make the connection to the mesh gateway 240 in DC2 170 which would then forward it along to DC1 160. As shown in FIG. 6, connection 5 between mesh gateway 210 and mesh gateway 240 is a direct route between DC3 and DC2. However, connection 6 between mesh gateway 240 and mesh gateway 230 is a part of a multi-hop route (connections 5 and 6) from DC3 to DC1.

In the above embodiment, the routing mechanism may be extended to with additional datacenters and hops to go through when routing. In an example embodiment, instead of having only one valid next-hop destination datacenter, there may be multiple next-hop destination datacenters. In an example embodiment where multiple next-hop datacenters are configured as part of a route or path to a target datacenter, a mesh gateway may ignore potential path with cycles in them and choose a best path.

Figure 7:
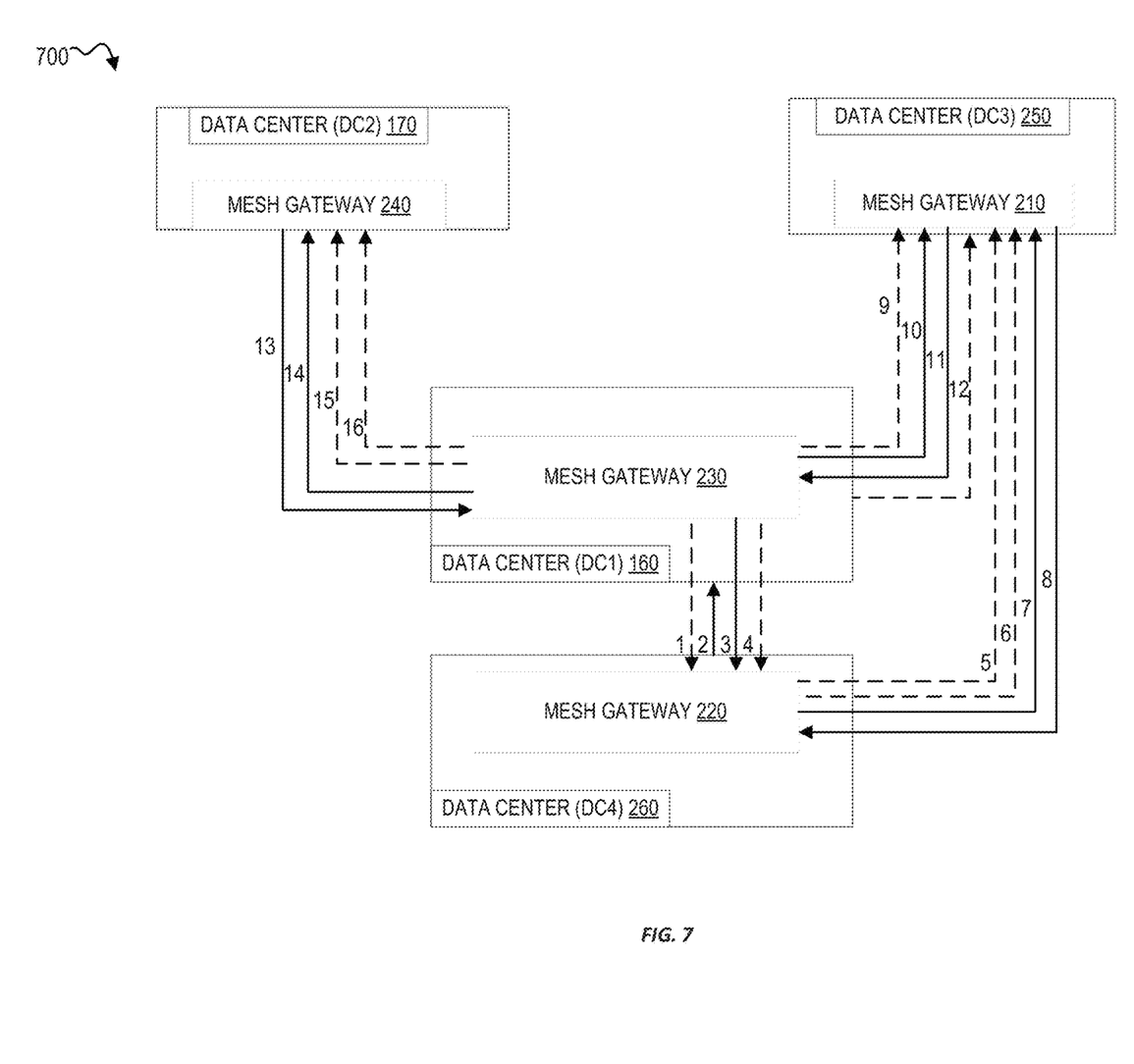
FIG. 7 depicts an example of cross datacenter service-to-service communication via multi-hop mesh gateways between four datacenters.

FIG. 7 depicts an example of cross datacenter service-to-service communication via multi-hop mesh gateways between four datacenters. As shown in FIG. 7, traffic from DC4 (260) to DC3 (260) may be routed in number of ways. In an example embodiment, it may go directly via its own direct connection 7, as disclosed in FIG. 7. In an alternative embodiment, it may be routed through DC1 (160) using direct connection 2 and multi-hop connection 9. Similarly, as shown in FIG. 7, mesh gateway 210 of DC3 (260) may directly route traffic to the mesh gateway 220 of DC4 (260) using direct connection 8, as disclosed in FIG. 7.

In above examples, a mesh gateway may prefer a multi-hop connection instead of a direction connection when a direct connection is down or slow. In the above embodiment, when a direct connection 7 (as disclosed in FIG. 7) from DC4 (260) to DC3 (260) is down or slow for some reason, it may be efficient to get a protocol message routed through DC1 (160).

In an alternate embodiment, a mesh gateway may always use single-hop or direct connection for traffic in all scenarios even if the direct connection is down or slow if a user of the service prefers single-hop connection and configures the mesh gateway to use only single-hop or direct connection to route the traffic.

Figure 8:
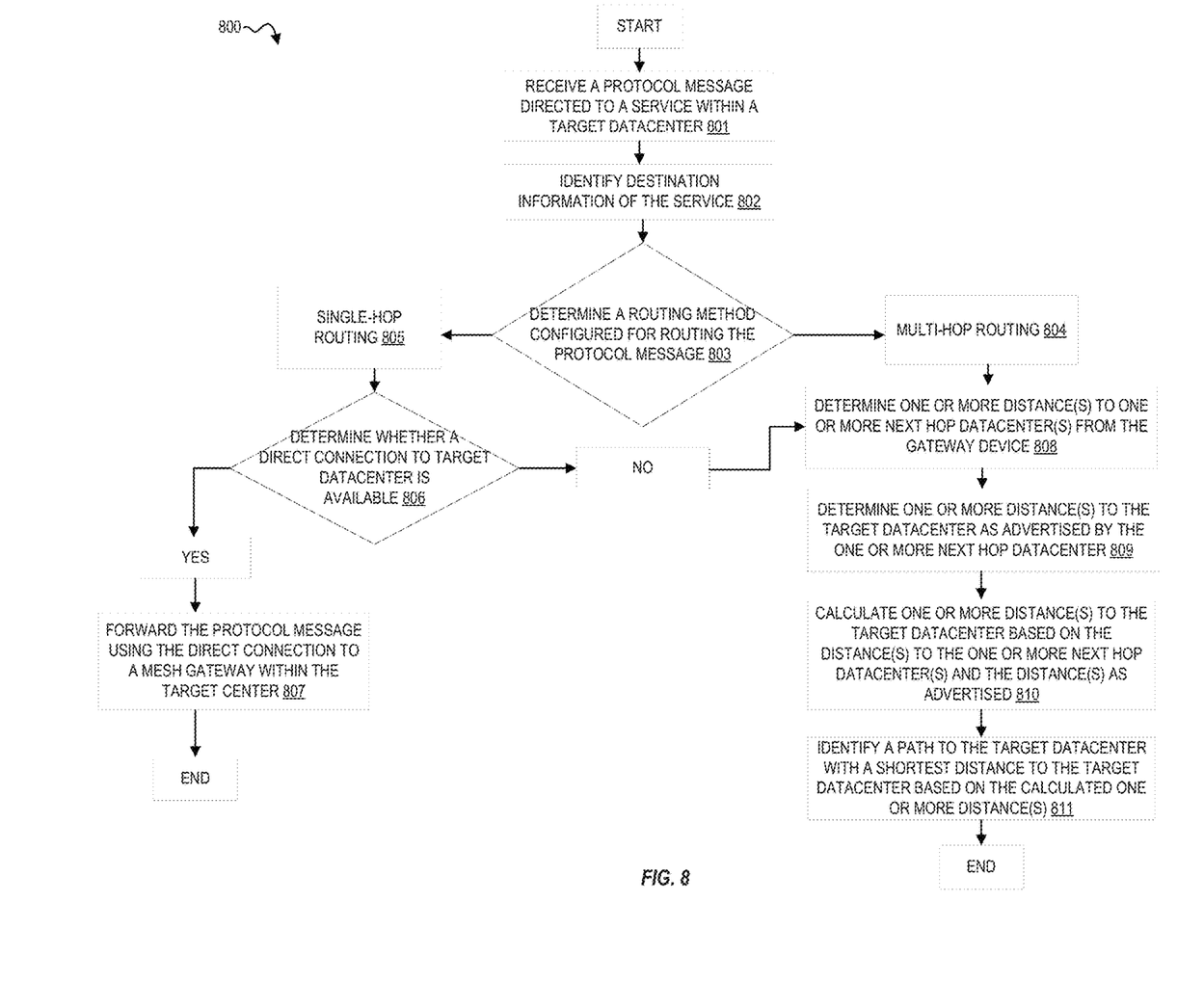
FIG. 8 depicts an example of steps performed to compute network route for cross datacenter service-to-service communication via multi-hop mesh gateways.

FIG. 8 depicts an example of steps performed to compute network route for cross datacenter service-to-service communication via multi-hop mesh gateways. In an example embodiment, as disclosed in step 801, a mesh gateway (e.g., gateway 210) may receive a protocol message directed to a service within a target datacenter (e.g., DC4 260). In an example embodiment, the protocol message may be a part of a Transport Layer Security (TLS)-Server Name Indication (SNI) handshake originated from a client service.

In an example embodiment, as shown in step 802, the mesh gateway (e.g., gateway 210) may identify the destination information associated of the service and the target datacenter (e.g., DC4 260) included in a SNI header of the protocol message. In the above embodiment, the mesh gateway device (e.g., gateway 210) may sniff at the SNI header of the protocol message associated with the TLS-SNI handshake to determine the destination information for the service.

In an example embodiment, as shown in step 803, the mesh gateway (e.g., gateway 210) may further determine a routing method configured for routing the protocol message. In the above embodiment, the routing method is configured according to the preference of a user of the service. In the above embodiment, the routing configuration for routing the protocol message is either single-hop routing (as shown in step 805) and a multi-hop routing (as shown in step 804). In a single-hop routing, a direct connection (e.g., connection 8 (as shown in FIG. 7)) from the mesh gateway (e.g., gateway 210) is used to transmit the protocol message to the target datacenter (e.g., datacenter DC4 260). In multi-hop routing method, the mesh gateway (e.g., gateway 210) may use a multi-hop route or a route through one or more intermediate datacenters (e.g., connections 11 and 1 as shown in FIG. 7) to transmit the protocol to the target datacenter (e.g., datacenter DC4 260).

In the above embodiment, upon determining that the routing configuration for the mesh gateway (e.g., gateway 210) is a single-hop routing, under step 805, the mesh gateway (e.g., gateway 210) may further determine whether the mesh gateway (e.g., gateway 210) has direct connection (e.g., connection 8, as shown in FIG. 7) to a mesh gateway (e.g., gateway 220) of the target datacenter (e.g., datacenter DC4 260) under step 806. Upon determining that the direct connection to the target datacenter (e.g., datacenter DC4 260) exists, the mesh gateway may use the direct connection (e.g., connection 8, as shown in FIG. 7) as the network route to the target datacenter (as shown in step 807 of FIG. 8). In the above embodiment, the mesh gateway may always use the direct connection to transmit the message to the target datacenter according to the user's preference even if the direct connection is either slow or down, and faster route is available.

In an alternate embodiment, the mesh gateway (e.g., gateway 240) may further determine that it does not have direct connection to the target datacenter (e.g., datacenter DC3 250, as shown in FIG. 7). In the above embodiment, upon determining that the direct connection to the target datacenter does not exist, the mesh gateway (e.g., gateway 240) may follow the below steps to determine the network route for routing the protocol message to the target datacenter (e.g., datacenter DC3 250, as shown in FIG. 7). In step 808, the mesh gateway (e.g., gateway 240) determines one or more distance(s) to one or more next-hop datacenter(s) (e.g., DC1 160, as shown in FIG. 7).

In the above embodiment, to determine relative distance to one or more next-hop datacenter(s) (e.g., DC1 160), the mesh gateway (e.g., gateway 240) may use network coordinates to compute the relative distance between datacenters (datacenter DC2 170 and datacenter DC1 160). Network coordinates provides an efficient way to measure network distance between these datacenter(s). In an example embodiment, control plane servers (e.g., server 166) may configure routes other datacenter(s) based on priority and distance between datacenters. These configured routes are pushed to the gateway (e.g., gateway 230) via xDS.

In the above embodiment, as shown in step 809, the gateway (e.g. gateway 240, as shown in FIG. 7) may further determine one or more distance(s) to a target datacenter (e.g., DC3 250) as advertised by the one or more next-hop datacenter(s) (e.g., DC1 160). In the above embodiment, when the one or more next-hop datacenter(s) (e.g., DC1 160) advertises indirect path to target datacenter (e.g., DC3 250), the relative distance(s) to target datacenter (e.g., DC3 250) is included in the payload.

In the above embodiment, the mesh gateway (e.g., gateway 240) may further calculate one or more total distance(s) (as shown in step 810) to the target datacenter (e.g., DC3 250) based on the distance(s) to the one or more next-hop datacenter(s) (e.g., DC1 160) and the distance(s) to target datacenter (e.g., DC3 250) as advertised. In an example embodiment, the mesh gateway (e.g., gateway 240) may calculate total distance(s) to the target datacenter (e.g., DC3 250) by adding the distance(s) to the one or more next-hop datacenter(s) and the distance(s) to target datacenter as advertised.

In the above embodiment, under step 811, the mesh gateway (e.g., gateway 240) may further identify a network route with a shortest total distance (e.g., connections 13 and 9, as shown in FIG. 7) to the target datacenter (e.g., DC3 250) from the one or more total distance(s) (e.g., connection route (13, 4, and 5) or connection route (13 and 9), as shown in FIG. 7) as calculated in step 810. In an alternate embodiment, steps 808 to 811 are performed if upon determining that the routing configuration for the mesh gateway is a multi-hop routing, under step 804. In the above embodiment, the mesh gateway may filter a reference to the first gateway device from the network route for routing the protocol message to prevent cyclical routes.

In above embodiments, once the network route is determined, the mesh gateway (e.g., gateway 240) may forward the protocol message to another gateway (e.g., gateway 210) within the target datacenter (DC3 250) by routing the protocol message through the determined network route (e.g., connection route 13 and 9, as shown in FIG. 7). Once the protocol message reaches the mesh gateway within the target datacenter, the mesh gateway may transmit the message to the target service internally within the target datacenter.

In an example embodiment, a distance to target datacenter is calculated based on round trip times (RTTs) recorded between all datacenters using the WAN gossip protocol. In an example embodiment, for multi-hop network routes, RTTs for each hopping datacenter on a network route to the target datacenter is added to compute a total distance to the target datacenter. In the above embodiment, multiple distances are computed for multiple network routes to the target datacenter. In the above embodiment, a shortest distance to the target datacenter may be chosen as the network route. In certain embodiments, a topological distance model between all datacenters may be available to be used to compute and select the shortest route to the target datacenter. This model may be used to calculate distances and select a shortest route to the target datacenter where the shortest route also meets other criteria such as health, actually hosting an instance of the service of the target datacenter, or is on the path to another datacenter that hosts the instance of the service.

In an example embodiment, the mesh gateway may use either a Local Area Network (LAN) or a Wide Area Network (WAN) Internet Protocol (IP) address to route the protocol message within the target datacenter. In an example embodiment, the mesh gateway may use at least one of a layer 4 and a layer 7 load balancing protocols for routing the protocol message.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof Processes can communicate using a variety of techniques including but not limited to conventional techniques for inter-process communications, and different pairs of processes may use different techniques, or the same pair of processes may use different techniques at different times.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   receiving, by a first gateway device, a protocol message directed to a service within a target datacenter from a plurality of datacenters;
   identifying, by the first gateway device, destination information of the service and the target datacenter;
   determining, by the first gateway device, a routing configuration for routing the protocol message to the target datacenter, wherein the routing configuration is a multi-hop routing;
   determining, by the first gateway device, a network route for routing the protocol message to the target datacenter based on the routing configuration;
   identifying, by the first gateway device, a route with a shortest total distance to the target datacenter, whereupon determining the routing configuration further comprises:
   determining, by the first gateway device, one or more distances to one or more next-hop datacenters and to the target datacenter as provided by the one or more next-hop datacenters, each distance being calculated based on the round trip time (RTT) recorded between all datacenters, wherein the RTT is calculated using a Wireless Area Network (WAN) gossip protocol;
   identifying, by the first gateway device, the network route with the shortest total distance to the target datacenter from the one or more total distances; and
   transmitting, by the first gateway device, the protocol message to a second gateway device associated with the target datacenter through the determined network route.

2. The method in accordance with claim 1, wherein the determining the one or more distances to the one or more next-hop datacenters further comprises calculating the one or more distances to the one or more next-hop datacenters using network coordinates of the datacenter associated with the first gateway device and the one or more next-hop datacenters.

3. The method in accordance with claim 1, further comprising filtering, by the first gateway device, a reference to the first gateway device from the network route for routing the protocol message to prevent cyclical routes.

4. The method in accordance with claim 1, wherein the protocol message is a part of a Transport Layer Security (TLS)-Server Name Indication (SNI) handshake originated from a client service.

5. The method in accordance with claim 1, wherein the first gateway device identifies the destination information of the service and the target datacenter by sniffing into the protocol message.

6. The method in accordance with claim 1, wherein the destination information associated with the service and the target datacenter is included in a SNI header of the protocol message, and determined via TLS-SNI handshake.

7. The method in accordance with claim 1, wherein the first gateway device uses at least one of a Local Area Network (LAN) and a Wide Area Network (WAN) Internet Protocol (IP) address to route the protocol message to the service within the target datacenter.

8. The method in accordance with claim 1, wherein the first gateway device uses at least one of a layer 4 and a layer 7 load balancing protocols for routing the protocol message.

* * * * *